(12) United States Patent
Shiraishi et al.

(10) Patent No.: US 11,186,289 B2
(45) Date of Patent: Nov. 30, 2021

(54) CONCEALMENT SYSTEM FOR IMPROVED SAFE DRIVING

(71) Applicant: TOYOTA JIDOSHA KABUSHIKI KAISHA, Toyota (JP)

(72) Inventors: Shinichi Shiraishi, Mountain View, CA (US); Eric Kim, Mountain View, CA (US); Takato Masuda, Toyota (JP)

( * ) Notice: Subject to any disclaimer, the term of this patent is extended or adjusted under 35 U.S.C. 154(b) by 126 days.

(21) Appl. No.: 15/941,321

(22) Filed: Mar. 30, 2018

(65) Prior Publication Data

US 2019/0300003 A1    Oct. 3, 2019

(51) Int. Cl.
| | | |
|---|---|---|
| *G07C 5/08* | (2006.01) | |
| *B60R 1/00* | (2006.01) | |
| *B60W 40/09* | (2012.01) | |
| *G06F 3/01* | (2006.01) | |
| *G06F 3/03* | (2006.01) | |
| *G07C 5/00* | (2006.01) | |

(52) U.S. Cl.
CPC ............ *B60W 40/09* (2013.01); *B60R 1/00* (2013.01); *G06F 3/017* (2013.01); *G06F 3/0317* (2013.01); *G07C 5/008* (2013.01); *G07C 5/0866* (2013.01); *B60K 2370/1438* (2019.05); *B60K 2370/736* (2019.05); *B60R 2300/205* (2013.01); *B60R 2300/308* (2013.01)

(58) Field of Classification Search
CPC ...... B60W 40/09; G06F 3/0317; G06F 3/017; G07C 5/008; G07C 5/0866; B60R 1/00; B60R 2300/308; B60R 2300/205; B60K 2370/1438; B60K 2370/736
See application file for complete search history.

(56) References Cited

U.S. PATENT DOCUMENTS

| | | | | |
|---|---|---|---|---|
| 9,255,813 | B2 * | 2/2016 | Liu | G06F 3/011 |
| 2012/0251995 | A1 * | 10/2012 | Ghyme | G09B 5/06 |
| | | | | 434/362 |
| 2014/0362195 | A1 * | 12/2014 | Ng-Thow-Hing | |
| | | | | G06K 9/00791 |
| | | | | 348/51 |
| 2017/0089710 | A1 * | 3/2017 | Slusar | B60R 1/00 |
| 2020/0413021 | A1 * | 12/2020 | Sato | G06F 3/017 |

FOREIGN PATENT DOCUMENTS

JP    PO2017-175621    9/2017

* cited by examiner

*Primary Examiner* — Joseph W Becker
(74) *Attorney, Agent, or Firm* — Burbage Law, P.C.; Jon-Michael Burbage; Elizabeth Ruzich (57) ABSTRACT

The disclosure includes embodiments for concealing a distracting object. A method according to some embodiments includes analyzing environment data to identify a distracting object that is viewable by a driver, wherein the environment data is generated by a sensor set of a first vehicle and the environment data describes an environment including the first vehicle. The method includes determining a risk value of concealing the distracting object from the driver. The method includes responsive to the risk value failing to meet a threshold value, overlaying a concealing graphic on the distracting object while the first vehicle is being operated.

20 Claims, 6 Drawing Sheets

CONCEALMENT SYSTEM FOR IMPROVED SAFE DRIVING

BACKGROUND

The specification relates to augmented reality for concealing distracting objects.

Distracted driving is the act of driving while engaged in other activities. Distracted driving is a serious problem because it leads to injuries for both and our society. In 2015, according to the National Highway Traffic Safety Administration (NHTSA), 3,477 people died and 391,000 people were injured because of distracted driving. Distracted driving also causes unnecessary traffic congestion. Although there are laws that prohibit drivers from engaging in behavior which can be classified as "distracted driving," such laws are generally difficult or impossible to enforce. For example, California has laws that prohibit driving while talking on a smartphone. However, in practice such laws are difficult to enforce since it is hard for police to identify when someone is talking on their smartphone.

SUMMARY

Described herein is a computer-implemented method for analyzing environment data to identify a distracting object that is viewable by a driver, wherein the environment data is generated by a sensor set of a first vehicle and the environment data describes an environment including the first vehicle. The method includes determining a risk value of concealing the distracting object from the driver. The method further includes responsive to the risk value failing to meet a threshold value, overlaying a concealing graphic on the distracting object while the first vehicle is being operated.

Implementations may include one or more of the following features. The method where the environment data includes views of an interior of the first vehicle captured by one or more interior cameras, the distracting object is a screen of a mobile device inside the first vehicle, and the concealing graphic is displayed in augmented reality (AR) goggles. The method further includes downloading a background image that corresponds to a current view of the driver, wherein the concealing graphic is the background image and aligning the background image with the current view such that the distracting object appears to be invisible. The method further includes generating a data structure that includes a latitude and longitude for different distracting objects in a geographic area, where analyzing environment data to identify the distracting object is further based on comparing a current location of the first vehicle to the latitude and longitude for different distracting objects described by the data structure. The method where the environment data also describes the environment of one or more other vehicles and the method further includes aggregating environment data from the one or more other vehicles and not the first vehicle. The method where the environment data also describes the environment of one or more other vehicles and the method further includes receiving aggregated environment data from a server or a roadside unit as part of a DSRC communication, where the aggregated environment data is aggregated from the environment data received from one or more other vehicles. The method further includes determining a size of the distracting object, where the concealing graphic corresponds to the size of the distracting object. The concealing graphic is displayed in AR goggles or a heads-up display unit. The method where distracting object data includes object priors or templates for a set of distracting objects, analyzing the environment data to identify the distracting object includes comparing the environment data to the distracting object data to identify the distracting object from the set of distracting objects, and determining the risk value of concealing the distracting object from the driver includes retrieving the risk value for the distracting object from a set of risk values for the set of distracting objects that corresponds to the set of distracting objects. The method where the distracting object is a billboard and the concealing graphic includes one or more of first vehicle information, an advertisement, and other interesting information that is overlaid on the billboard.

One general aspect includes a system of a first vehicle comprising: an onboard vehicle computer system including a non-transitory memory storing computer code which, when executed by the onboard vehicle computer system causes the onboard vehicle computer system to: analyze environment data to identify a distracting object that is viewable by a driver, wherein the environment data is generated by a sensor set of the first vehicle and the environment data describes an environment of the first vehicle, determine a risk value of concealing the distracting object from the driver, and responsive to the risk value failing to meet a threshold value, generate a concealing graphic; and an augmented reality (AR) system that is operable to receive the concealing graphic from the onboard vehicle computer system and overlay the concealing graphic on the distracting object while the first vehicle is being operated.

Implementations may include one or more of the following features. The system where the environment data includes views of an interior of the first vehicle captured by one or more interior cameras, the distracting object is a screen of a mobile device inside the first vehicle, and the AR system includes AR goggles that display the concealing graphic. The system where the non-transitory memory includes additional computer code that causes the onboard vehicle computer system to: download a background image that corresponds to a current view of the driver, wherein the concealing graphic is the background image and align the background image with the current view such that the distracting object appears to be invisible. The system where the non-transitory memory includes additional computer code that causes the onboard vehicle computer system to: generate a data structure that includes a latitude and longitude for different distracting objects in a geographic area, where analyzing environment data to identify the distracting object is further based on comparing a current location of the first vehicle to the latitude and longitude for different distracting objects described by the data structure. The system where the non-transitory memory includes additional computer code that causes the onboard vehicle computer system to: receive aggregated environment data from a server or a roadside unit as part of a dedicated short range communication (DSRC), wherein the aggregated environment data is aggregated from the environment data received from one or more other vehicles.

One general aspect includes a computer program product including a non-transitory memory of an onboard vehicle computer system of a first vehicle storing computer-executable code that, when executed by the onboard vehicle computer system, causes the onboard vehicle computer system to: analyze environment data to identify a distracting object that is viewable by a driver, wherein the environment data is generated by a sensor set of a first vehicle and the environment data describes an environment of the first vehicle, determine a risk value of concealing the distracting object from the driver, and responsive to the risk value failing to meet a threshold value, overlay a concealing graphic on the distracting object while the first vehicle is being operated.

Implementations may include one or more of the following features. The computer program product where the environment data includes views of an interior of the first vehicle captured by one or more interior cameras, the distracting object is a screen of a mobile device inside the first vehicle, and the concealing graphic is displayed in AR goggles. The computer program product where the non-transitory memory includes additional computer code that causes the onboard vehicle computer system to: download a background image that corresponds to a current view of the driver, wherein the concealing graphic is the background image and align the background image with the current view such that the distracting object appears to be invisible. The computer program product where the non-transitory memory includes additional computer code that causes the onboard vehicle computer system to: generate a data structure that includes a latitude and longitude for different distracting objects in a geographic area, where analyzing environment data to identify the distracting object is further based on comparing a current location of the first vehicle to the latitude and longitude for different distracting objects described by the data structure. The computer program product where the non-transitory memory includes additional computer code that causes the onboard vehicle computer system to: receive aggregated environment data from a server or a roadside unit as part of a DSRC communication, wherein the aggregated environment data is aggregated from the environment data received from one or more other vehicles.

According to the California Driver Handbook, there are typically three types of driver distractions: (1) eyes off the road (visual); (2) mind off the road (cognitive); and (3) hands off the steering wheel (manual). The description below removes the visual distractions and removes the mind off the road driver distractions in instances where the distraction is caused by visual distractions. The concealment system has a positive impact on safe driving that is bigger than existing solutions that are passive and that do not actively remove visual distractions from the driver's vision.

The concealment system includes many advantages. First, the concealment system determines whether it is safe to conceal distracting objects by determining a risk value associated with a distracting object and only concealing the object if the risk value fails to meet a threshold value. Second, the concealment system uses an augmented reality system to ensure that the distracting object is concealed so well that it becomes invisible. For example, if the distracting object is part of a driver's current view, the concealment system may align a background image with the current view to make the distracting object invisible. Third, the concealment system may apply to both distracting objects in an outside environment and an inside environment. For example, if situations where the driver is using augmented reality goggles, the concealment system may generate a concealing graphic that is overlaid on a driver's mobile device so that the drive is not distracted by the mobile device inside the vehicle.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Example Overview

In some embodiments, a concealment application analyzes environment data to identify a distracting object that is viewable by a driver. The distracting object may be in an environment that is external to the car, such as a billboard or internal to the car, such as a mobile device. The concealment application may analyze the environment data by comparing the environment data to distracting object data, where the distracting object data includes object priors or templates for a set of distracting objects. The concealment application may identify the distracting object from the set of distracting objects. For example, the distracting object may be the screen of a mobile device.

The concealment application may determine a risk value of concealing the distracting object from the driver. The concealment application may retrieve the risk value from a set of risk values that correspond to teach distracting object in the set of distracting objects. For example, the risk value may correspond to a risk value for the screen of a mobile device.

If the risk value fails to meet a threshold value, the concealment application instructs an augmented reality (AR) system to overlay a concealing graphic on the distracting object while the first vehicle is being operated. For example, the AR system may include AR goggles that overlay a black screen on the mobile device to make it appear that the mobile device does not receive notifications.

Distinguishing Augmented Reality from Virtual Reality

AR and virtual reality (VR) are not the same thing. In VR, a user is wearing a VR headset that does not allow the user to see the outside world and a pair of headphones that provide audio that corresponds to the images displayed by the VR headset while also canceling out the sound of the real-world. In other words, the purpose of VR is to immerse the user in a VR world so that they forget about the real-world entirely.

Accordingly, VR is not suitable for deployment in vehicles since it distracts the driver from the roadway present in the real-world, and so, it is a safety hazard for this reason. The AR system does not provide a VR experience to a driver because doing so would be a life-risking safety hazard.

The AR system make take two forms: AR goggles or a heads-up display unit. AR goggles include transparent glass (or plastic or some other suitable transparent material) that is configured to allow the user to see the real-world when looking through the AR goggles. The AR goggles displays may display a concealing graphic that is overlaid on a distracting object. The user may also be wearing an AR glove that enhances or modifies the way the real-world feels. In other words, the purpose of AR is to add experiences to the real-world without causing the user to forget about the real-world entirely since the real-world is a part of the AR experience.

Example Overview

Figure 1:
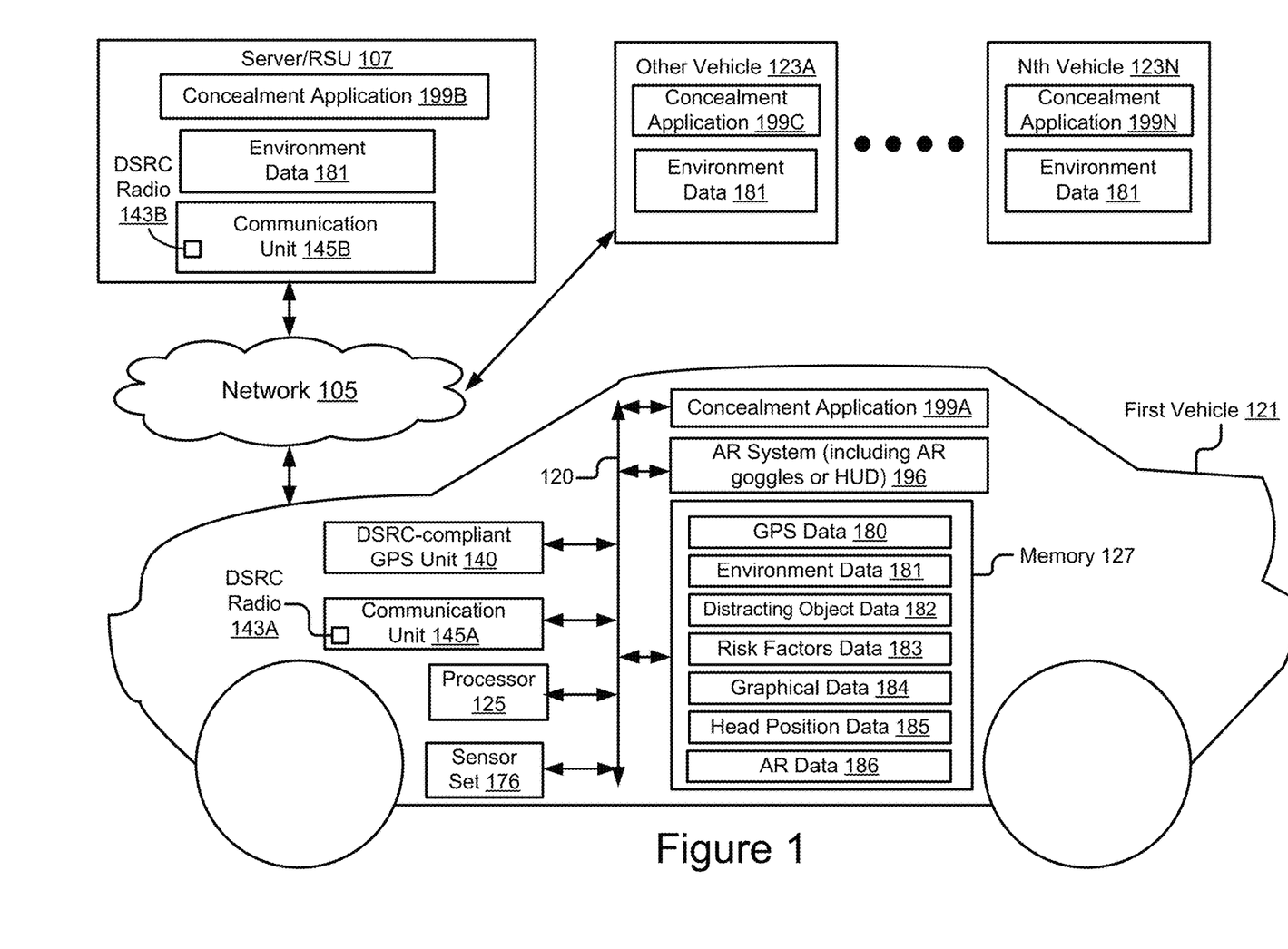
FIG. 1 is a block diagram illustrating an operating environment for a concealment system of a vehicle according to some embodiments.

Referring to FIG. 1, depicted is a concealment system 100 for a concealment application 199A of a first vehicle 121 according to some embodiments. The concealment system 100 may include a first vehicle 121, a server/roadside unit (RSU) 107, an other first vehicle 121A, and an nth first vehicle 121N. These elements may be communicatively coupled to one another via a network 105. Although one first vehicle 121, one server/RSU 107, one other first vehicle 121A, and one nth first vehicle 121N, and one network 105 are depicted in FIG. 1, in practice the concealment system 100 may include one or more first vehicles 121, one or more servers/RSUs 107, one or more other vehicles 123A, one or more nth vehicles 123N, and one or more networks 105.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols. In some embodiments, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, dedicated short-range communication (DSRC), full-duplex wireless communication, etc. The network 105 may also include a mobile data network or a combination of mobile data networks that includes Wi-Fi; 3G; 4G; LTE; 5G; DSRC; mmWave; full-duplex wireless communication; and any other wireless protocol suitable for transmission in a roadway environment. Further, the network 105 may include one or more IEEE 802.11 wireless networks.

In some embodiments, the first vehicle 121, the other first vehicle 121A, and/or the nth first vehicle 121N is a DSRC-equipped vehicle. The network 105 may include one or more communication channels shared among two or more of the first vehicle 121, the other first vehicle 121A, the nth first vehicle 121N, and the server/RSU 107. The communication channel may include DSRC, LTE-V2X, full-duplex wireless communication, or any other wireless communication protocol. For example, the network 105 may be used to transmit a DSRC message, a DSRC probe, a basic safety message (BSM) or a full-duplex message including any of the data described herein.

The first vehicle 121 is any type of vehicle. For example, the first vehicle 121 is one of the following types of vehicles: a car; a truck; a sports utility vehicle; a bus; a semi-truck; a drone, or any other roadway-based conveyance.

In some embodiments, the first vehicle 121 includes one or more of the following elements: a processor 125; a memory 127; a DSRC-compliant global positioning system (GPS) unit 140; a communication unit 145A; an AR system 195; and a concealment application 199A. These elements of the first vehicle 121 are communicatively coupled to one another via a bus 120.

The communication unit 145A of the first vehicle 121 and the communication unit 145B of the server/RSU 107 may be referred to herein collectively or individually as the "communication unit 145" since, for example, the communication unit 145A of the first vehicle 121 provides similar functionality to the components of the first vehicle 121 as does the communication unit 145B of the server/RSU 107.

The server/RSU 107 is a processor-based computing device that aggregates environment data 181 and transmits the aggregated environment data 181 to the first vehicle 121, the other vehicle 123A, and/or the nth vehicle 123N. If the server/RSU 107 is a server, the server may include one or more of the following types of processor-based computing devices: a personal computer; a laptop; a mainframe; or any other processor-based computing device that is operable to function as a server. If the server/RSU 107 is an RSU, the RSU may include a communication unit 145B with a DSRC radio 143B to communicate with the first vehicle 121, the other vehicle 123A, and/or the nth vehicle 123N using DSRC messages. The server/RSU 107 may also include a concealment application 199B.

The other vehicle 123A and the nth vehicle 123N each include a concealment application (199C and 199N, respectively) and environment data. The concealment application 199 may receive environment data that describes an environment surrounding the vehicle and transmit the environment data 181 to the server/RSU 107 or directly to the first vehicle 121. Although not illustrated, the other vehicle 123A and the nth vehicle 123N may each include a DSRC radio and a DSRC-compliant GPS unit.

Although the other vehicle 123A and the nth vehicle 123N are illustrated as including environment data 181, in some embodiments, the other vehicle 123A and the nth vehicle 123N may include distracting object data and risk factors data 183. For example, the concealment applications 119C and 199N may compare their environment data 181 to the distracting object data 182 to identify distracting objects. The concealment applications 119C and 199N may generate risk factors for corresponding distracting objects to identify risk values. The concealment applications 119C and 199N may transmit the distracting objects and the risk factors to the first vehicle 121 and/or the server/RSU 107 instead of all of the environment data 181 to reduce bandwidth requirements.

The first vehicle 121 and the server/RSU 107 are now described.

First Vehicle 121

In some embodiments, the processor 125 and the memory 127 may be elements of an onboard vehicle computer system (such as computer system 200 described below with reference to FIG. 2). The onboard vehicle computer system may be operable to cause or control the operation of the concealment application 199A. The onboard vehicle computer system may be operable to access and execute the data stored on the memory 127 to provide the functionality described herein for the concealment application 199A or its elements (see, e.g., FIG. 2). The onboard vehicle computer system may be operable execute the concealment application 199A which causes the onboard vehicle computer system to execute one or more of the steps of the method 600 described below with reference to FIG. 6.

The processor 125 includes an arithmetic logic unit, a microprocessor, a general-purpose controller, or some other processor array to perform computations and provide electronic display signals to a display device. The processor 125 processes data signals and may include various computing architectures including a complex instruction set computer (CISC) architecture, a reduced instruction set computer (RISC) architecture, or an architecture implementing a combination of instruction sets. The first vehicle 121 may include one or more processors 125. Other processors, operating systems, sensors, displays, and physical configurations may be possible.

The memory 127 stores instructions or data that may accessed and executed by the processor 125. The instructions or data may include code for performing the techniques described herein. The memory 127 may be a dynamic random access memory (DRAM) device, a static random access memory (SRAM) device, flash memory, or some other memory device. In some embodiments, the memory 127 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. A portion of the memory 127 may be reserved for use as a buffer or virtual random access memory (virtual RAM). The first vehicle 121 may include one or more memories 127.

The memory 127 of the first vehicle 121 may store one or more of the following elements: GPS data 180, environment data 181, distracting object data 182, risk factors data 183, graphical data 184, head position data 185, and AR data 186.

The GPS data 180 is digital data that includes vehicle location data that is managed by the DSRC-compliant GPS unit 140. The GPS data 180 may describe the location of the first vehicle 121 with an accuracy of plus or minus 1.5 meters of the actual location of the first vehicle 121 in the real world. This is because the lane of a roadway is about 3 meters wide, and so, an accuracy of plus or minus 1.5 meters is sufficiently precise that it enables an other vehicle 123A and an nth vehicle 123N which receive the GPS data 180 to know the exact lane of travel of each vehicle on the roadway that is also DSRC-equipped. The GPS data 180 may be timestamped to indicate the time when the first vehicle 121 was at a particular location.

The environment data 181 is digital data that describes the external environment outside the vehicle and the internal environment inside the vehicle. The environment data 181 may be generated from the sensor set 176. For example, external cameras that are part of the sensor set 176 may record video or capture images that describe the external environment. Similarly, internal cameras that are part of the sensor set 176 may record video or capture images that describe the internal environment. The environment data 181 may include descriptions of environments gathered from an other vehicle 123A and a nth vehicle 123N. For example, the environment data 181 may include aggregated environment data 181 received from the server/RSU 107 as part of a DSRC communication, such as a DSRC message.

The distracting object data 182 is digital data that describes templates or object priors for distracting objects. The distracting object data 182 may include an expected location, size, color, and other attributes for different types of distracting objects. For example, the distracting object data 182 may describe billboards as being located along the roadways at a certain height and of a size between X and Y. The distracting object data 182 may describe a set of distracting objects that includes accident scenes, other drivers, pedestrians, cyclists, motorcyclists, construction, street vendors, panhandlers, interesting cars, sidewalk commotion, buildings and architecture, police, emergency vehicles, weather, advertising, billboards, and mobile devices inside a vehicle.

In some embodiments, the distracting object data 182 includes a table that describes the latitude and longitude for different distracting objects in a geographic area, such as billboard advertisements, neon signs, buildings, or other infrastructure whose design is interesting and therefore distracting, construction zones, locations that are known to generally include panhandlers, places of interest, etc. The concealment application 199 may compare the GPS data 180 to the distracting object data 182 to identify whether a current GPS location for the vehicle corresponds to the location for a distracting object.

The risk factors data 183 is digital data that quantifies the risk of concealing an object from the driver's vision using the AR system 186. The risk factors data 183 describes risk factors that are used by the concealment application 199 to perform a risk assessment. The risk factors data 183 may include a set of risk values that correspond to each distracting object in the set of distracting objects. The risk factor data 183 may include different risk factors. For example, the risk value associated with an accident in the same lane as the driver would indicate that it is risky to conceal the accident because the driver might wind up in an accident. Conversely, the risk value associated with an accident that is on the shoulder of the roadway may indicate that it is not risky to conceal the accident because the accident would distract the driver with no added safety benefit.

In some embodiments, the risk factors include (1) as a type of distracting object, a material the distracting object is composed of, a size of the distracting object, and a velocity of the distracting object; (2) human involvement; (3) communication of important information, such as signs and traffic cones; (4) a current vehicle velocity and predicted trajectory of the vehicle; (5) a human attention state as indicated by internal sensors of the sensor set 176; (6) an effectiveness of the concealment method; and (7) position and velocity of other vehicles, along with predicted trajectories.

The risk factors data 183 includes a threshold. If the risk value fails to meet a threshold value, the concealment application 199 may decide to overlay the distracting object with a concealing graphic. For example, if the risk value is 4 and the threshold value is 5, the risk value may fail to meet the threshold value. If the risk value meets or exceeds the threshold value, the concealment application 199 may do nothing because it is too risky to conceal the distracting object. Other approaches for managing a comparison of the risk value to a threshold value may be used.

The graphical data 184 is digital data that describes distracting objects and a size of the distracting objects. In some embodiments, the graphical data 184 also includes the digital data for different concealing graphics that are generated by the concealing application 199. For example, the graphical data 184 may include background images that are downloaded from public databases, such as Google™ Street View, and used to align with a current view of the driver to make a distracting object invisible.

The head position data 185 is digital data that describes an orientation of the driver's head with x, y, and z coordinates.

The head position data 185 may be generated from images of the driver captured by an internal camera of the sensor set 176 or the AR system 196, such as AR goggles that describe the orientation and motion of the driver. The head position data 185 is used by the AR system 196 to orient a concealing graphic so that the concealing graphic conceals the distracting object.

The AR data 186 is digital data that is operable to cause the AR system 196 to display the concealing graphic having a size determined by the concealment application 199 and at a location determined by the concealment application 199.

The DSRC-compliant GPS unit 140 is hardware that is operable to record GPS data 180. The DSRC standard requires that all vehicles include a GPS unit with hardware to make the GPS compliant with DSRC, such as a DSRC antenna.

The communication unit 145A transmits and receives data to and from a network 105 or to another communication channel. In some embodiments, the communication unit 145A includes a DSRC radio 143A. A DSRC radio 143A is a hardware element including: (1) a DSRC transmitter that is operable to transmit DSRC messages on the 5.9 GHz band that is reserved for DSRC messages; and (2) a DSRC receiver that is operable to receive DSRC messages on the 5.9 GHz band. The DSRC radio 147 may receive the DSRC messages from the server/RSU 107, the other vehicle 123A, or the nth vehicle 123N. The DSRC radio 143A may automatically broadcast DSRC messages every 0.10 seconds.

In some embodiments, the communication unit 145A includes a port for direct physical connection to the network 105 or to another communication channel. For example, the communication unit 145A includes a USB, SD, CAT-5, or similar port for wired communication with the network 105. In some embodiments, the communication unit 145A includes a wireless transceiver for exchanging data with the network 105 or other communication channels using one or more wireless communication methods, including: IEEE 802.11; IEEE 802.16, BLUETOOTH®; EN ISO 14906: 2004 Electronic Fee Collection—Application interface EN 11253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); the communication method described in U.S. patent application Ser. No. 14/471,387 filed on Aug. 28, 2014 and entitled "Full-Duplex Coordination System"; or another suitable wireless communication method.

In some embodiments, the communication unit 145A includes a full-duplex coordination system as described in U.S. patent application Ser. No. 14/471,387 filed on Aug. 28, 2014 and entitled "Full-Duplex Coordination System."

In some embodiments, the communication unit 145A includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 145A includes a wired port and a wireless transceiver. The communication unit 145A also provides other conventional connections to the network 105 for distribution of files or media objects using standard network protocols including TCP/IP, HTTP, HTTPS, and SMTP, millimeter wave, DSRC, etc.

The sensor set 176 may include one or more external sensors that are operable to describe an external environment outside the first vehicle 121 and one or more internal sensors that are operable to describe an internal environment inside the first vehicle 121.

The external sensors of the sensor set 176 may record one or more physical characteristics of the physical environment that is proximate to the first vehicle 121. For example, the external sensors may capture environment data 181 that includes distracting objects. The external sensors may store the captured images in the memory 127.

The internal sensors of the sensor set 176 are sensors inside the first vehicle 121. In some embodiments, the internal sensors include sensors that monitor a head position of the driver to generate head position data 185. In some embodiments, the internal sensors that monitor the head position of the driver are part of the AR system 196, such as embodiments where the AR device 1968 includes AR goggles.

The AR system 196 includes hardware operable to overlay a concealing graphic onto a distracting object. The AR system 196 is configured so that the driver can still be focused on the driving experience.

The AR system 196 may include AR goggles that are any conventional AR goggles, goggles, or glasses. Examples of the AR goggles may include one or more of the following: Google™ Glass; CastAR; Moverio BT-200; Meta; Vuzix M-100; Laster SeeThru; Icis; Optinvent ORA-S; GlassUP; Atheer One; K-Glass; and Microsoft™ Hololens. The AR goggles are configured so that a driver of the first vehicle 121 can be focused on the driving experience when operating the first vehicle 121.

The AR goggles may monitor the head position of the driver and generate head position data 185. The head position data 185 may be collected, for example, as exhaust data that is routinely generated by the AR system 196.

The AR system 196 may include one or more AR gloves. The AR glove is a haptic feedback glove that is configured so that the driver of the first vehicle 121 can touch, grasp, and feel virtual objects as if they were real (see, for example, the virtual object 320 depicted in FIG. 3). For example, the virtual object graphically represents a knob and the AR glove is operable to provide haptic feedback to the driver so that virtual object feels firm when touched by the driver's hand that is included in the AR glove. If the virtual object is metal, the AR glove is operable to provide haptic and temperature-based feedback so that the virtual object feels cool and hard when touched by the driver's hand that is included in the AR glove. If the virtual object represents leather or some other soft, textured object, then the AR glove is operable to provide haptic feedback so that the virtual object feels soft and textured when touched by the driver's hand that is included in the AR glove.

In some embodiments, the AR glove includes force-feedback units (herein "motors") to apply torque to the driver's fingers which is included in the AR glove. These motors are operable, when controlled by the AR system 196, to dynamically alter the direction and magnitude of the force caused by the driver's hand/finger motion in order to simulate a specific virtual object's stiffness. In this way, the motors of the AR glove provide light resistance when the driver is handling a virtual object that represents a soft object like a leather knob or handle, and heavy resistance when the virtual object is representing a denser object, such as one that would be made of metal in the real-world.

In some embodiments, the AR glove includes other smaller motors that provide haptic vibrations to the driver's fingertips inside the AR glove. These haptic vibrations simulate the impact of the driver's finger tapping on a touch interface or running across a textured surface.

In some embodiments, the motors included in the AR glove are sufficiently powerful that they are operable to provide physical feedback that is capable of physically preventing the driver's fingers from penetrating through virtual objects displayed by the AR goggles.

Figure 4:
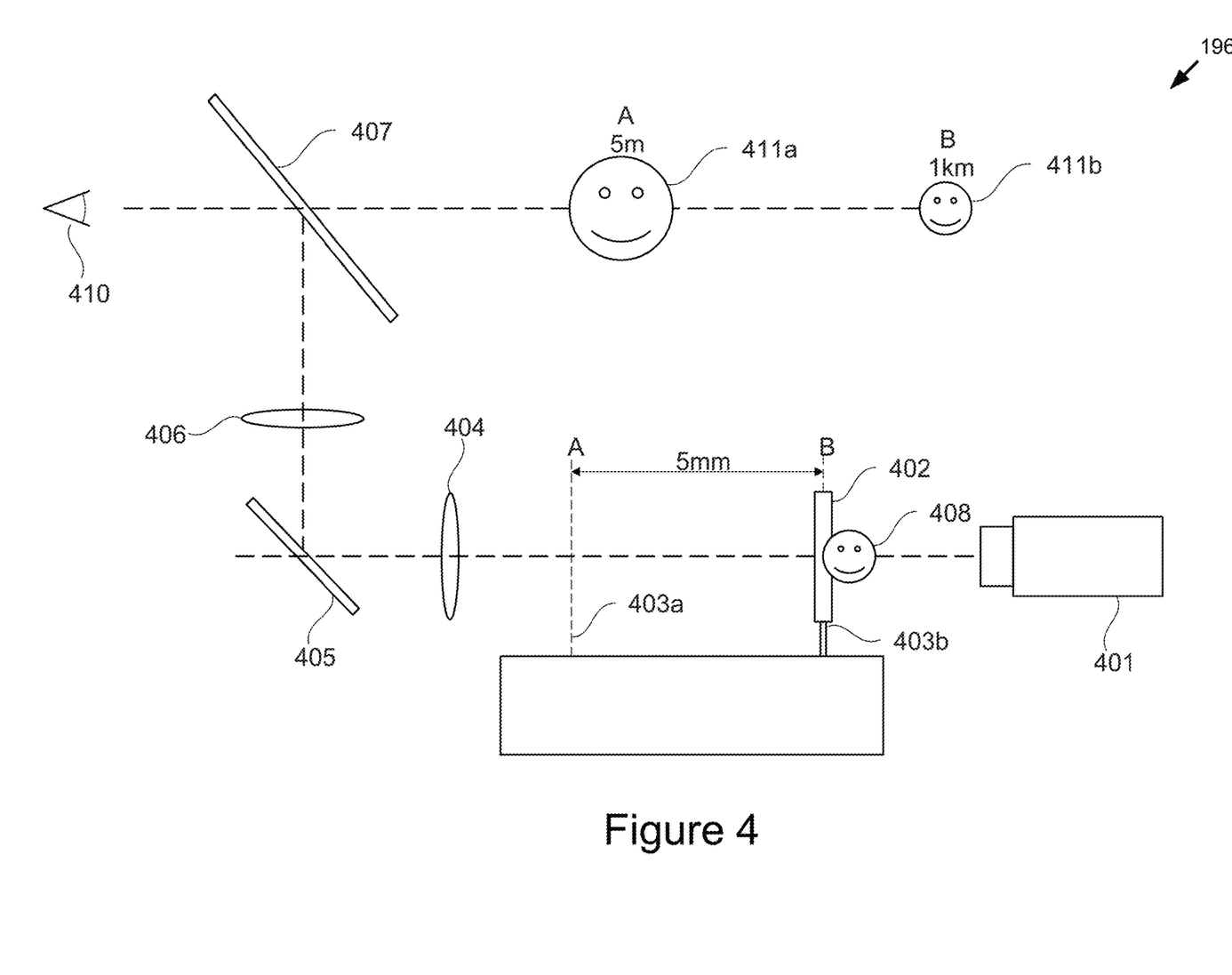
FIG. 4 is a block diagram illustrating an example AR system that includes a three-dimensional heads-up display unit according to some embodiments.

In some embodiments, the AR system 196 is a three-dimensional heads-up display unit (3D HUD). An example of the 3D HUD is depicted in FIG. 4. For example, a driver of the first vehicle 121 may view the 3D HUD and the 3D HUD may display a concealing graphic that is overlaid on the distracting graphic. The 3D HUD is described in more detail below with reference to FIG. 5.

In some embodiments, the concealment application 199A include code or routines for analyzing the environment data 181 to identify a distracting object that is viewable by the driver. The concealment application 199A determines a risk value of concealing the distracting object from the driver. If the risk value fails to meet a threshold value, the concealment application 199A instructs the AR system 196 to overlay a concealing graphic on the distracting object while the first vehicle is being operated.

In some embodiments, the concealment application 199A of the first vehicle 121 may be implemented using hardware including a field-programmable gate array (FPGA) or an application-specific integrated circuit (ASIC). In some other embodiments, the concealment application 199A may be implemented using a combination of hardware and software. The concealment application 199A may be stored in a combination of the devices (e.g., the first vehicle 121, the server/RSU 107, the other vehicle 123A, the nth vehicle 123N, or other devices), or in one of the devices.

The AR system 196 is described in more detail below with reference to FIG. 2.

Server/Roadside Unit 107

In some embodiments, the server/RSU 107 is a cloud server/RSU that includes a concealment application 199B, environment data 181, and a communication unit 145B with a DSRC radio 143B. The communication unit 145B and the DSRC radio 143B are similar to the communication unit 145A and the DSRC radio 143A that were discussed above with reference to the first vehicle 121, and so, the descriptions of these elements will not be repeated here.

The communication unit 145B handles communications between the server/RSU 107, the first vehicle 121, the other vehicle 123A, and/or the nth vehicle 123N via the network 105. The communication unit 145B may receive environment data 181 from any of the first vehicle 121, the, the other vehicle 123A, and the nth vehicle 123N. The concealment application 199B may aggregate the environment data 181 from the first vehicle 121, the other vehicle 123A, and/or the nth vehicle 123N. The concealment application 199B may use the aggregated environment data 181 to identify, for each of the vehicles, a distracting object and determine whether a risk value associated with the distracting object fails to meet a threshold value. If the risk value fails to meet a threshold value, the concealment application 199B may generate, for each of the vehicles, AR data 186 that includes instructions for displaying the concealing graphic on an AR system 196.

In some embodiments, instead of determining whether to display the concealing graphic, the concealment application 199B transmits aggregated environment data 181 to the first vehicle 121, the other vehicle 123A, and/or the nth vehicle 123N. The concealment application 199 on each of the respective vehicles may use the aggregated environment data 181 to identify the location of distracting objects and determine whether to generate concealing graphics for the distracting objects. By receiving aggregated environment data 181 from vehicles that may be ahead of a vehicle, such as the first vehicle 121, the concealment application 199 is able to advantageously make decisions that further ensure the safety of the driver.

Example Computing Device

Figure 2:
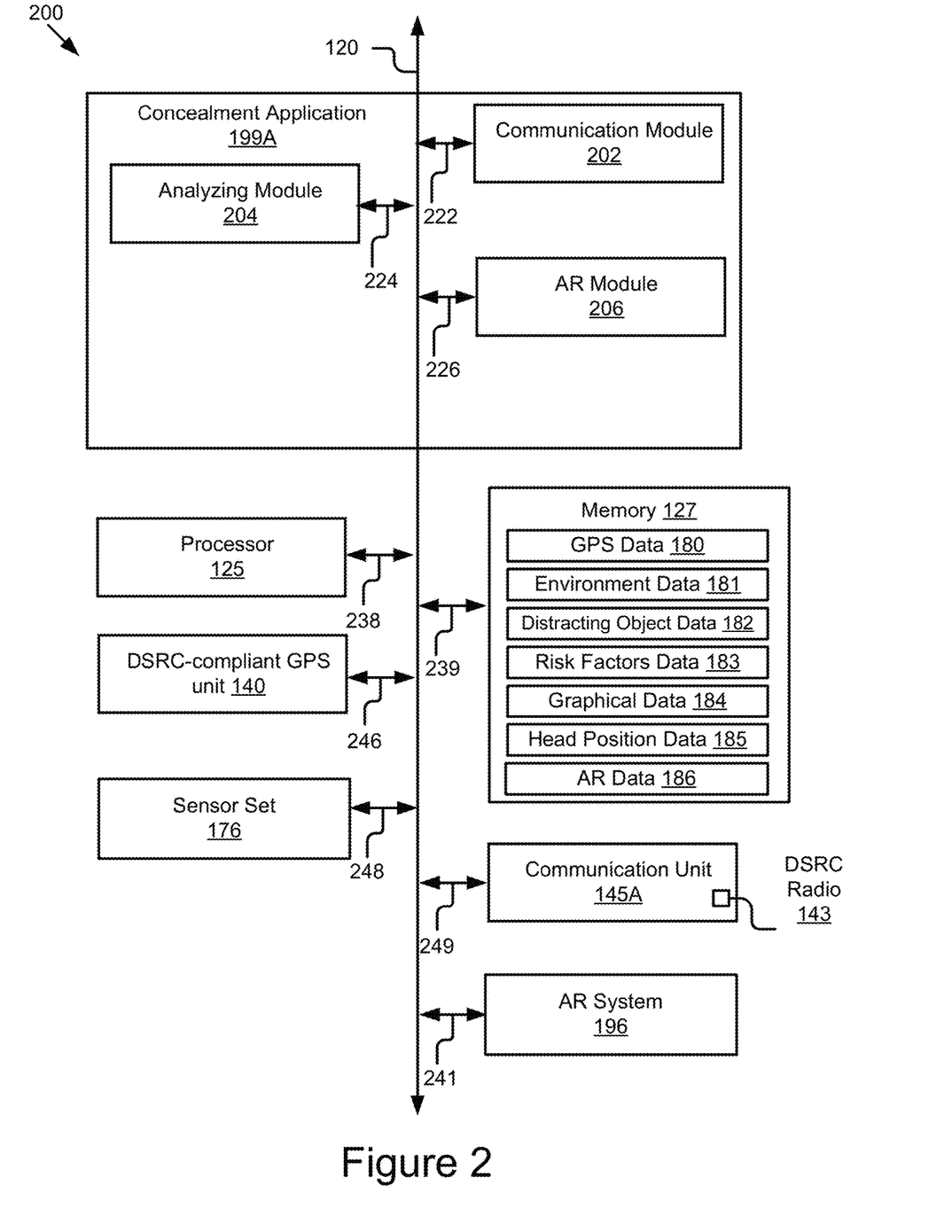
FIG. 2 is a block diagram illustrating an example computer system including the concealment application of a vehicle according to some embodiments.

Referring now to FIG. 2, depicted is a block diagram illustrating an example computer system 200 including a concealment application 199A, a processor 125, a memory 127, a DSRC-compliant GPS unit 140, a communication unit 145A, a sensor set 176, and an AR system 196 according to some embodiments.

In some embodiments, the computer system 200 may include a special-purpose computer system that is programmed to perform one or more steps of a method 600 described below with reference to FIG. 6. In some embodiments, the computer system 200 may be an element the server/RSU 107. In some embodiments, the computer system 200 may be an onboard vehicle computer of the first vehicle 121. In some embodiments, the computer system 200 may include an electronic control unit, head unit or some other processor-based computing device of the first vehicle 121.

In the illustrated embodiment, the processor 125 is communicatively coupled to the bus 120 via signal line 238. The memory 127 is communicatively coupled to the bus 120 via signal line 239. The DSRC-compliant GPS unit 140 is communicatively coupled to the bus 120 via signal line 246. The communication unit 145A is communicatively coupled to the bus 120 via a signal line 249. The sensor set 176 is communicatively coupled to the bus 120 via a signal line 248. The AR system 196 is communicatively coupled to the bus 120 via a signal line 241.

The following elements of the computer system 200 were described above with reference to FIG. 1, and so, those descriptions will not be repeated here: the processor 125; the memory 127; the DSRC-compliant GPS unit 140; the communication unit 145A; the sensor set 176; and the AR system 196.

The memory 127 may store any of the data described above with reference to FIG. 1. The memory 127 may store any data necessary for the computer system 200 to provide its functionality.

In the illustrated embodiment shown in FIG. 2, the concealment application 199A includes a communication module 202, an analyzing module 204, and an AR module 206.

The communication module 202 can be software including routines for handling communications between the concealment application 199A and other components of the computer system 200. In some embodiments, the communication module 202 can be a set of instructions executable by the processor 125 to provide the functionality described below for handling communications between the concealment application 199A and other components of the computer system 200. In some embodiments, the communication module 202 can be stored in the memory 127 of the computer system 200 and can be accessible and executable by the processor 125. The communication module 202 may be adapted for cooperation and communication with the processor 125 and other components of the computer system 200 via signal line 222.

The communication module 202 sends and receives data, via the communication unit 145A, to and from one or more elements of the concealment system 100. For example, the communication module 202 receives or transmits, via the communication unit 145A, one or more of the following elements: the GPS data 180, the environment data 181, distracting object data 182, risk factors data 183, graphical data 184, head position data 185, and AR data 186. The communication module 202 may send or receive any of the data or messages described above with reference to FIG. 1 or below with reference to FIG. 6 via the communication unit 145A.

The communication module 202 may receive environment data 181 from an other vehicle 123A and an nth vehicle 123N and not the first vehicle 121 via the communication unit 145A. The communication module 202 may aggregate the environment data 181 to form aggregated environment data 181. Alternatively or additionally, the communication module 202 may receive aggregated environment data 181 from the server/RSU 107.

In some embodiments, the communication module 202 receives data from components of the concealment application 199A and stores the data in the memory 127 (or a buffer or cache of the AR glove). For example, the communication module 202 receives aggregated environment data 181 from the server/RSU 107 from the communication unit 145A (via the network 105) and stores this data in the memory 127 (or a buffer or cache of the AR system 196).

In some embodiments, the communication module 202 may handle communications between components of the concealment application 199A. For example, the analyzing module 204 may transmit environment data 181 to the AR module 206 for the AR module 206 to use in generating a concealing graphic.

The analyzing module 204 can be software including routines for analyzing distracting objects. In some embodiments, the analyzing module 204 can be a set of instructions executable by the processor 125 to provide the functionality described below for analyzing distracting objects. In some embodiments, the analyzing module 204 can be stored in the memory 127 of the computer system 200 and can be accessible and executable by the processor 125. The analyzing module 204 may be adapted for cooperation and communication with the processor 125 and other components of the computer system 200 via signal line 224.

In some embodiments, the analyzing module 204 analyzes environment data 181 that describes an environment of the first vehicle 121 to identify distracting objects in the environment data 181. The environment data 181 may include aggregated environment data 181 that describes the environment of other vehicles 123. The environment data 181 may describe the environment external to the first vehicle 121 and/or the internal environment of the first vehicle 121.

The analyzing module 204 may identify a distracting object by comparing the environment data 181 to distracting object data 182. The distracting object data 182 may include object priors or templates for a set of distracting objects. For example, the analyzing module 204 may identify objects in images that are described by the environment data 181, compare the objects to the distracting object data 182, and determine if the objects match any object priors or templates for a set of distracting objects.

In some embodiments, the analyzing module 204 retrieves a data structure, such as a table from the memory 127 that describes the latitude and longitude for different distracting objects in a geographic area. The table may be received from the server/RSU 107, which uses the aggregated environment data 181 from the first vehicle 121, the other vehicle 123A, and the nth vehicle 123N to For example, the analyzing module 204 may determine that an object in the environment data 181 is likely a billboard because the first vehicle 121 is within proximity of the geographic area of the billboard and the distracting object data 182 includes a description of a billboard as having a particular characteristics.

The analyzing module 204 may generate a confidence score for each object in the environment data 181 that describes a likelihood that the object is a distracting object based on whether the object matches an object prior or a template and based on whether the location of the first vehicle 121 matches the location described in the table.

The analyzing module 204 performing a risk assessment by determining a risk value of concealing a distracting object from the driver. In some embodiments, the analyzing module 204 uses risk factors data 183 to retrieve a risk value from a set of risk values that corresponds to the distracting object in the set of distracting objects. In some embodiments, a distracting object is associated with multiple risk factors. For example, the risk factors may include: (1) a type of distracting object, a material the distracting object is composed of, a size of the distracting object, and a velocity of the distracting object; (2) human involvement; (3) communication of important information, such as signs and traffic cones; (4) a current vehicle velocity and predicted trajectory of the vehicle; (5) a human attention state as indicated by internal sensors of the sensor set 176; (6) an effectiveness of the concealment method (e.g., it is more difficult to conceal a large opaque fabric floating in the wind if the concealment application 199 is unable to determine what is behind the fabric); and (7) position and velocity of other vehicles, along with predicted trajectories (however, additional confidence is placed on predicted trajectories if the nearby vehicle is equipped with vehicle to vehicle (V2V) communications).

The analyzing module 204 determines whether the risk value fails to meet a threshold value and, if so, instructs the graphical interface 206 to generate a concealing graphic. For example, if the risk value is below a threshold value, the analyzing module 204 determines that it is safe to use a concealing graphic. If the risk value is above the threshold value, the analyzing module 204 determines that it would be too risky to using a concealing graphic to hide the distracting object.

In some embodiments, the analyzing module 204 calculates a benefit to the driver from concealing the distracting object and requires this benefit to meet or exceed a threshold before the concealment graphic is displayed. The analyzing module 204 may apply a classifier that compares the current situation with a database of scenarios that are part of the distracting object data 182 that are identified as distracting to drivers. The classifier may provide a rough estimate of how useful it is to conceal a distracting object and makes adjustments depending on the actual situation. For example, concealing a distracting object is more useful when another object or obstacle in the environment places a greater safety hazard and if the driver is unaware of that object's presence.

The AR module 206 can be software including routines for generating a concealing graphic. In some embodiments, the AR module 206 can be a set of instructions executable by the processor 125 to provide the functionality described below for generating the concealing object. In some embodiments, the AR module 206 can be stored in the memory 127 of the computer system 200 and can be accessible and executable by the processor 125. The AR module 206 may be adapted for cooperation and communication with the processor 125 and other components of the computer system 200 via signal line 226.

The AR module 206 may receive instructions from the analyzing module 204 to generate a concealing graphic. In some embodiments, the AR module 206 generates a concealing graphic that is configured to blend with the environment and be non-distracting such that the driver does not know that anything is being concealed from their vision. For example, the AR module 206 may download a background image from a public database, such as Google™ Street view and stitch the background image onto the driver's view. The background image may be retrieved from the memory 127 as graphical data. The AR module 206 may also determine a size for the concealing graphic based on the size of the distracting object, which is stored in the memory 127 as graphical data 184.

In another example where the AR system 196 includes AR goggles, the environment data 181 includes images of an internal environment. For example, the sensor set includes one or more internal cameras that identify the driver's mobile device as a distracting object. The AR module 208 generates a concealing graphic that the AR goggles overlay on the screen of the mobile device so notifications from the mobile device do not distract the driver.

In some embodiments, the concealing graphic is a black box or some other graphic that hides the distracting object from the driver's view. The black box does not prevent the driver from knowing that an object is hidden, but it does not change the driver's behavior because shifting attention to the obscured area is not stimulating and exciting. Instead of a black box, the AR module 208 may generate a concealing graphic that is blurring, white noise, or a color filter.

In some embodiments, the AR module 208 may confirm that the concealing graphic does not also conceal any signs behind the object, such as a stop sign. If the concealing graphic conceals important objects, the AR module 208 may download a background image that includes the important objects and generate a concealing graphic that includes the important objects and obscures the distracting object. For example, the concealing graphic may use blurring lines to conceal a construction project but include a sign that includes the speed limit.

In some embodiments, the AR module 208 may generate a concealing graphic that replaces a distracting object with interesting information for the driver. For example, if the distracting object is a billboard with advertisements for cosmetic surgery, the AR module 208 may replace the text within the billboard with information about a new model of the vehicle that will be available next year, an advertisement, or information about the first vehicle 121 (e.g., mileage, miles until gas runs out, battery charge, etc.). The AR module 208 may instruct the AR system 196 to overlay the concealing graphic over the distracting object.

The AR module 208 may determine how to display the concealing graphic on the AR system 196 depending on the type of AR system 196.

Where the AR system 196 includes a 3D HUD, the AR module 208 may calculate a Cartesian coordinate set that describes where the concealing graphic will be displayed in the 3D HUD based on the location of the distracting object in the real-world. The AR module 208 may determine the location of the distracting object in the real world based on the environment data 181 using range finder sensor measurements. The AR module 208 may use the head position data 185 for the driver to determine the orientation of the driver's head and the distance between the driver's head and the 3D HUD. The AR module 208 may determine a size of the concealing graphic to overlay the distracting object and remove it from the driver's vision. The AR module 208 accounts for the projection of the image in the 3D HUD onto the driver's visual plane as the first vehicle 121 moves relative to the distraction object.

Where the AR system 196 includes AR goggles, the AR module 208 may retrieve head position data 185 that describes an orientation of the driver's head with x, y, and z coordinates. The AR module 208 may use the head position data 185 to determine a current orientation of the driver's head and, as a result, generate AR data 186 that describes an orientation and a size of the concealing graphic that overlays the distracting object. The AR module 208 accounts for the projection of the image in the AR glasses onto the driver's visual plane as the first vehicle 121 moves relative to the distraction object.

The AR module 208 may instruct the AR system 196 to display the concealing graphic so long as the first vehicle 121 is in operation. For example, the AR system 196 may only display the concealing graphic while the first vehicle 121 is in motion.

Figure 3:
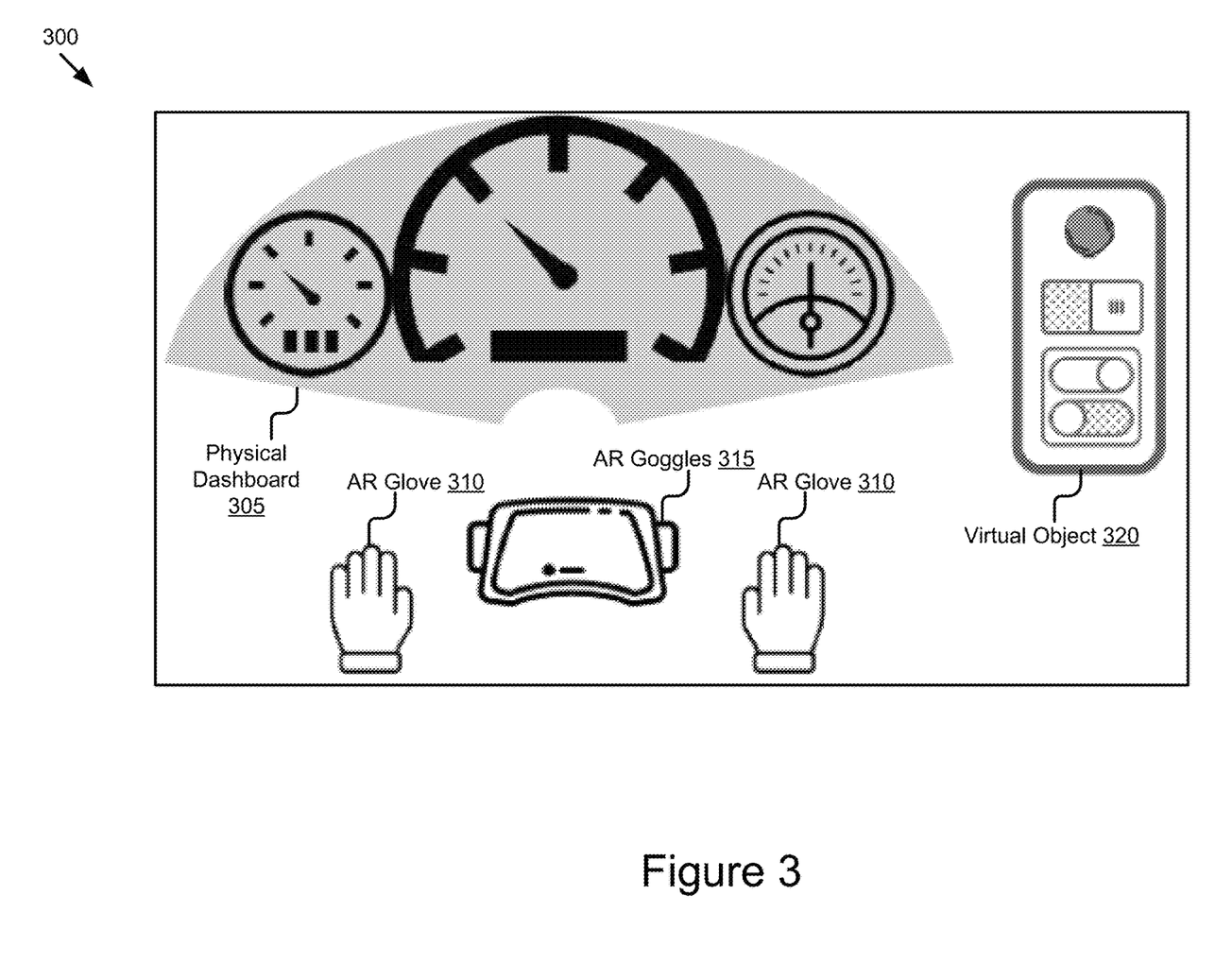
FIG. 3 is a block diagram illustrating an example of an augmented reality (AR) system that includes AR goggles according to some embodiments.

Referring to FIG. 3, depicted is a block diagram illustrating an example of an AR system 300 that includes AR goggles 315 according to some embodiments. In this example, the AR system 300 includes a physical dashboard 305 of a vehicle, a pair of AR gloves 310, AR goggles 315, and a virtual object 320. The virtual object 320 is located at a point in three-dimensional space of the real-world which, according to the vision of the driver when looking through the AR goggles 315 includes the virtual object 320. The AR gloves 310 and the virtual object 320 are additional elements of an AR system 196 that may not be needed for some embodiments.

FIG. 3 includes an illustration of the interior of a vehicle. The vehicle includes a physical dashboard 305. The AR system 196 may generate a concealing graphic that conceals a distracting object in the external environment that is displayed above the physical dashboard 305 or a distracting object in the internal environment that is displayed inside the vehicle, such as below the physical dashboard 305.

Referring to FIG. 4, depicted is a block diagram illustrating an AR system 196 in embodiments where the AR system 196 is a 3D HUD.

In some embodiments, the 3D HUD includes a projector 401, a movable screen 402, a screen-driving unit 403, an optical system (including lenses 404, 406, reflector 405, etc.). The projector 401 may be any kind of projector such as a digital mirror device (DMD) projector or a liquid crystal projector. The projector 401 projects an image (graphic) 408 on the movable screen 402. The image 408 may include a virtual object. For example, the image 408 may be a concealing graphic.

The movable screen 402 includes a transparent plate and so the light of the projected image transmits through the movable screen 402 to be projected on the windshield 407 of a vehicle (e.g., the first vehicle 121). The image projected on the windshield 407 is perceived by a driver 410 as if it is a real object (shown as 411a, 411b) that exists in the three-dimensional space of the real-world, as opposed to an object that is projected on the windshield.

In some embodiments, the 3D HUD is operable to control the direction of the image relative to the driver 410 (in other words, the image position in the windshield) by adjusting the projection position on the screen 402. Further the screen 402 is movable by the screen-driving unit 403 in the range between the positions 403a and 403b. Adjusting the position of the screen 402 can vary the depth (distance) of the projected image from the driver 410 in the real-world. In one example, the movable range of the screen 402 (distance between positions 403a and 403b) may be 5 mm, which correspond to from 5m away to infinity in the real-world. The use of the 3D HUD allows the driver 410 to perceive the projected image exist in the real-world (three-dimensional space). For example, when an image is projected at the same three-dimensional position (or substantially same depth at least) as a real object (such as a pedestrian, car, etc.), the driver does not need to adjust eye focus in order to view the projected image, resulting in easy grasp of the projected image while looking at the real object.

The 3D HUD depicted in FIG. 4 is provided by way of example. Other examples are possible. These examples may include heads-up displays having more or less complexity than the 3D HUD depicted in FIG. 4. For example, it is anticipated that in the future there will be heads-up displays that do not require movable parts such as the movable screen 402. For example, a static screen that does not move may be deployed. The heads-up display deployed may not be a two-dimensional heads-up display unit. In some embodiments, the AR system 196 and the concealing graphic are designed to be operable with such components.

Figure 5A:
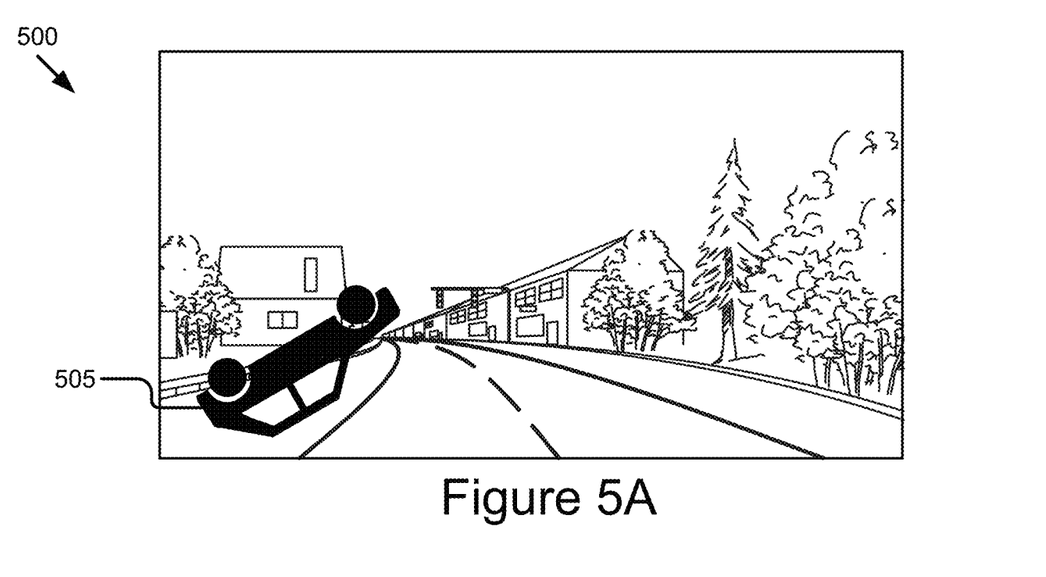
FIG. 5A is a block diagram illustrating an example current view as viewed by a driver of a first vehicle according to some embodiments.

FIG. 5A is a block diagram 500 illustrating an example current view as viewed by a driver of a first vehicle. In this example, there is an accident 505 along the shoulder of the roadway. The accident is not obscuring the roadway and would not pose any danger to the driver of the vehicle. Instead, the accident would only server to distract the driver.

Figure 5B:
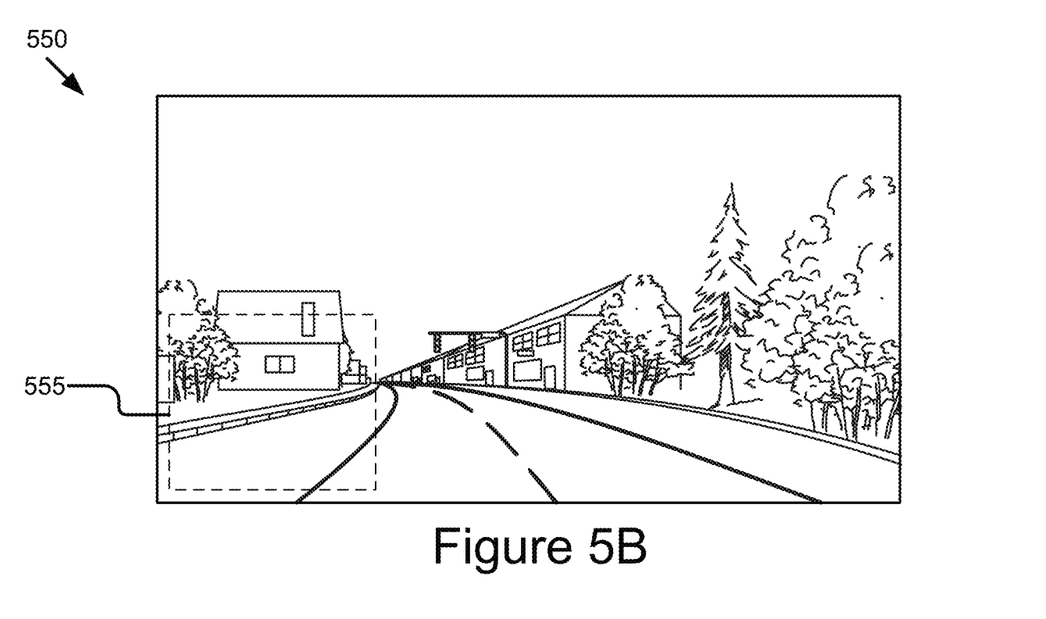
FIG. 5B is a block diagram illustrating a concealing graphic that is overlaid on the current view illustrated in FIG. 5A according to some embodiments.

FIG. 5B is a block diagram 550 illustrating a concealing graphic that is overlaid on the current view illustrated in FIG. 5A. In this example, the concealment application 199 determines that the accident is a distracting object and that it is not too risky to conceal the accident from the driver. As a result, the concealment application 199 generates a concealing graphic 555 from a background image that renders the accident essentially invisible.

Example Method

Figure 6:
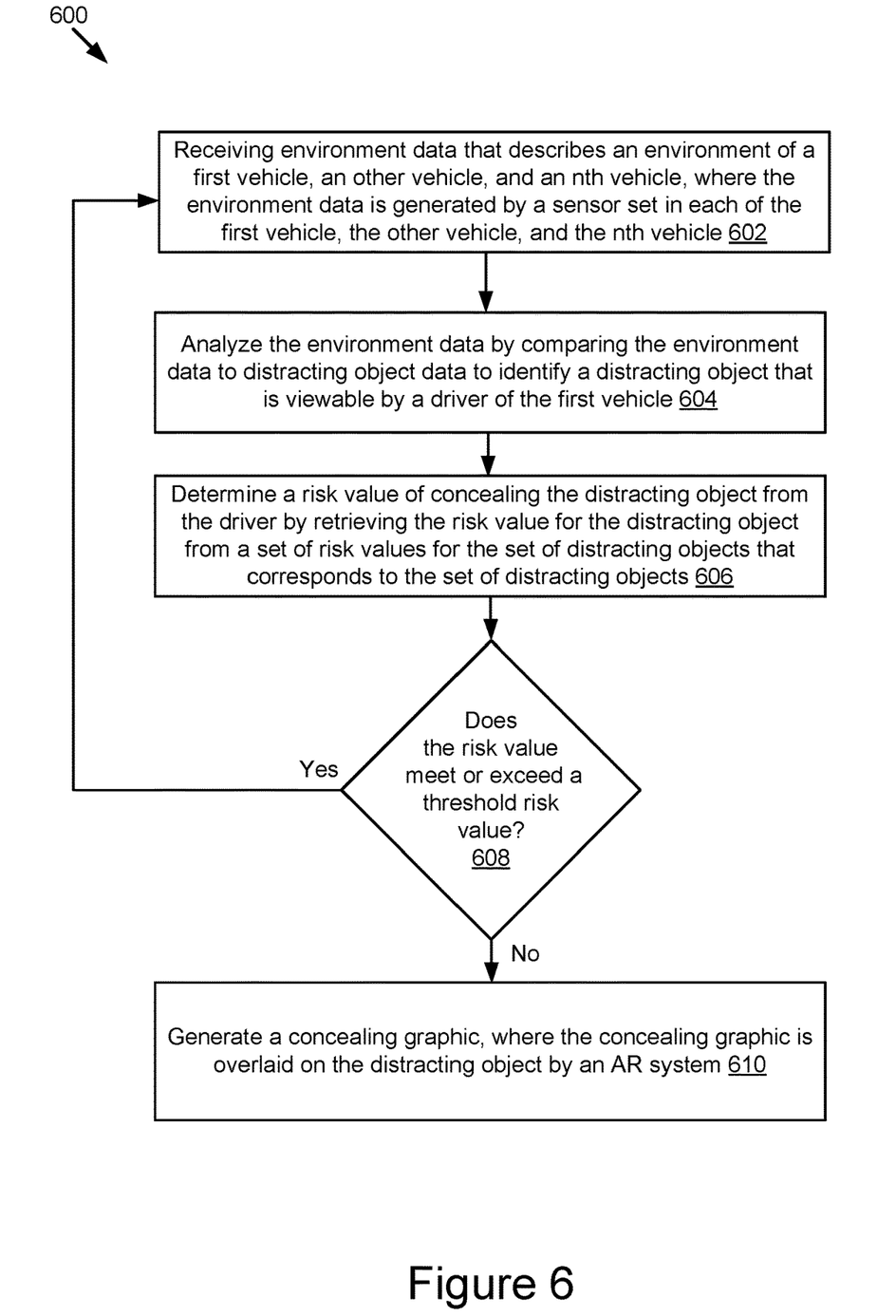
FIG. 6 is a flow diagram illustrating an example method for generating a concealing graphic for a distracting object according to some embodiments.

Referring now to FIG. 6, depicted is a flowchart of an example method 600 for generating a concealing graphic for a distracting object using a concealment application 199 as described with reference to FIGS. 1 and/or 2. One or more of the steps described herein for the method 300 may be executed by one or more computer systems 200 as described with reference to FIG. 2.

At step 602, environment data 181 is received that describes an environment of a first vehicle 121, an other vehicle 123A, and an nth vehicle 123N, where the environment data 181 is generated by a sensor set in each of the first vehicle 121, the other vehicle 123A, and the nth vehicle 123N.

At step 604, the environment data 181 is analyzed by comparing the environment data 181 to distracting object data 182 to identify a distracting object that is viewable by a driver of the first vehicle 121.

At step 606, a risk value of concealing the distracting object from the driver is determined by retrieving the risk value for the distracting object from a set of risk values for the set of distracting objects that corresponds to the set of distracting objects.

At step 608, it is determined whether the risk value meets or exceeds a threshold risk value. If the risk value meets or exceeds a threshold risk value, the method 600 proceeds to step 602 and continues to analyze the environment data 181 until a distracting object is identified that is not too risky to display. If the risk value fails to meet a threshold risk value, at step 610, a concealing graphic is generated, where the concealing graphic is overlaid on the distracting object by an AR system 196.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A computer-implemented method comprising:
   analyzing environment data to identify a distracting object that is viewable by a driver, wherein the environment data is generated by a sensor set of a first vehicle and the environment data describes an environment including the first vehicle;
   determining a risk value of concealing the distracting object from the driver;
   responsive to the risk value failing to meet a threshold value, downloading a background image that corresponds to a current view of the driver;
   receiving head position data that describes an orientation of a head of the driver; and
   displaying in a three-dimensional heads-up display that includes a movable screen with a transparent plate such that light is projected through the movable screen, based on the head position data, the background image as aligned with the current view such that the distracting object appears to be invisible while the first vehicle is being operated.

2. The method of claim 1, further comprising calculating a Cartesian coordinate set that describes where the background image is to be displayed in the three-dimensional heads-up display based on a location of the distracting object in the environment.

3. The method of claim 1, wherein the background image is downloaded from a public database.

4. The method of claim 1, further comprising:
   generating a data structure that includes a latitude and longitude for different distracting objects in a geographic area;
   wherein analyzing environment data to identify the distracting object is further based on comparing a current location of the first vehicle to the latitude and longitude for different distracting objects described by the data structure.

5. The method of claim 1, wherein adjusting a position of the movable screen varies a depth of the background image.

6. The method of claim 1, wherein the environment data also describes the environment of one or more other vehicles and further comprising:
   receiving aggregated environment data from a server or a roadside unit as part of a basic safety message, wherein the aggregated environment data is aggregated from the environment data received from the one or more other vehicles.

7. The method of claim 1, further comprising:
   determining a size of the distracting object;
   wherein the background image corresponds to the size of the distracting object.

8. The method of claim 1, wherein the head position data describes the orientation of the head of the driver with x, y, and z coordinates.

9. The method of claim 1, wherein:
distracting object data includes object priors or templates for a set of distracting objects;
analyzing the environment data to identify the distracting object includes comparing the environment data to the distracting object data to identify the distracting object from the set of distracting objects; and
determining the risk value of concealing the distracting object from the driver includes retrieving the risk value for the distracting object from a set of risk values for the set of distracting objects that corresponds to the set of distracting objects.

10. The method of claim 1, wherein:
the distracting object is a first distracting object;
a second distracting object is a billboard; and
further comprising overlaying a concealing graphic on the second distracting object that includes one or more of first vehicle information, an advertisement, or other interesting information on the billboard.

11. A system of a first vehicle comprising:
an onboard vehicle computer system including a non-transitory memory storing computer code which, when executed by the onboard vehicle computer system causes the onboard vehicle computer system to:
analyze environment data to identify a distracting object that is viewable by a driver, wherein the environment data is generated by a sensor set of the first vehicle and the environment data describes an environment of the first vehicle;
determine a risk value of concealing the distracting object from the driver;
responsive to the risk value failing to meet a threshold value, download a background image that corresponds to a current view of the driver; and
a three-dimensional heads-up display that includes a movable screen with a transparent plate such that light is projected through the movable screen and that is operable to receive the concealing graphic from the onboard vehicle computer system, receive head position data that describes an orientation of a head of the driver, and display based on the head position data, the background image as aligned with the current view such that the distracting object appears to be invisible.

12. The system of claim 11, wherein the three-dimensional heads-up display enables the driver to view the background image without adjusting eye focus.

13. The system of claim 11, wherein the background image is downloaded from a public database.

14. The system of claim 11, wherein the non-transitory memory includes additional computer code that causes the onboard vehicle computer system to:
generate a data structure that includes a latitude and longitude for different distracting objects in a geographic area;
wherein analyzing environment data to identify the distracting object is further based on comparing a current location of the first vehicle to the latitude and longitude for different distracting objects described by the data structure.

15. The system of claim 11, wherein the non-transitory memory includes additional computer code that causes the onboard vehicle computer system to:
receive aggregated environment data from a server or a roadside unit as part of a basic safety message, wherein the aggregated environment data is aggregated from the environment data received from one or more other vehicles.

16. A computer program product comprising a non-transitory memory of an onboard vehicle computer system of a vehicle storing computer-executable code that, when executed by the onboard vehicle computer system, causes the onboard vehicle computer system to:
analyze environment data to identify a distracting object that is viewable by a driver, wherein the environment data is generated by a sensor set of a first vehicle and the environment data describes an environment of the first vehicle;
determine a risk value of concealing the distracting object from the driver;
responsive to the risk value failing to meet a threshold value, download a background image that corresponds to a current view of the driver;
receive head position data that describes an orientation of a head of the driver; and
display in a three-dimensional heads-up display that includes a movable screen with a transparent plate such that light is projected through the movable screen, based on the head position data, the background image as aligned with the current view such that the distracting object appears to be invisible while the first vehicle is being operated.

17. The computer program product of claim 16, wherein the head position data describes the orientation of the head of the driver with x, y, and z coordinates.

18. The computer program product of claim 16, wherein the background image is downloaded from a public database.

19. The computer program product of claim 16, wherein the non-transitory memory includes additional computer code that causes the onboard vehicle computer system to:
generate a data structure that includes a latitude and longitude for different distracting objects in a geographic area;
wherein analyzing environment data to identify the distracting object is further based on comparing a current location of the first vehicle to the latitude and longitude for different distracting objects described by the data structure.

20. The computer program product of claim 16, wherein the non-transitory memory includes additional computer code that causes the onboard vehicle computer system to:
receive aggregated environment data from a server or a roadside unit as part of a basic safety message, wherein the aggregated environment data is aggregated from the environment data received from one or more other vehicles.

* * * * *